United States Patent Office 2,693,827
Patented Nov. 9, 1954

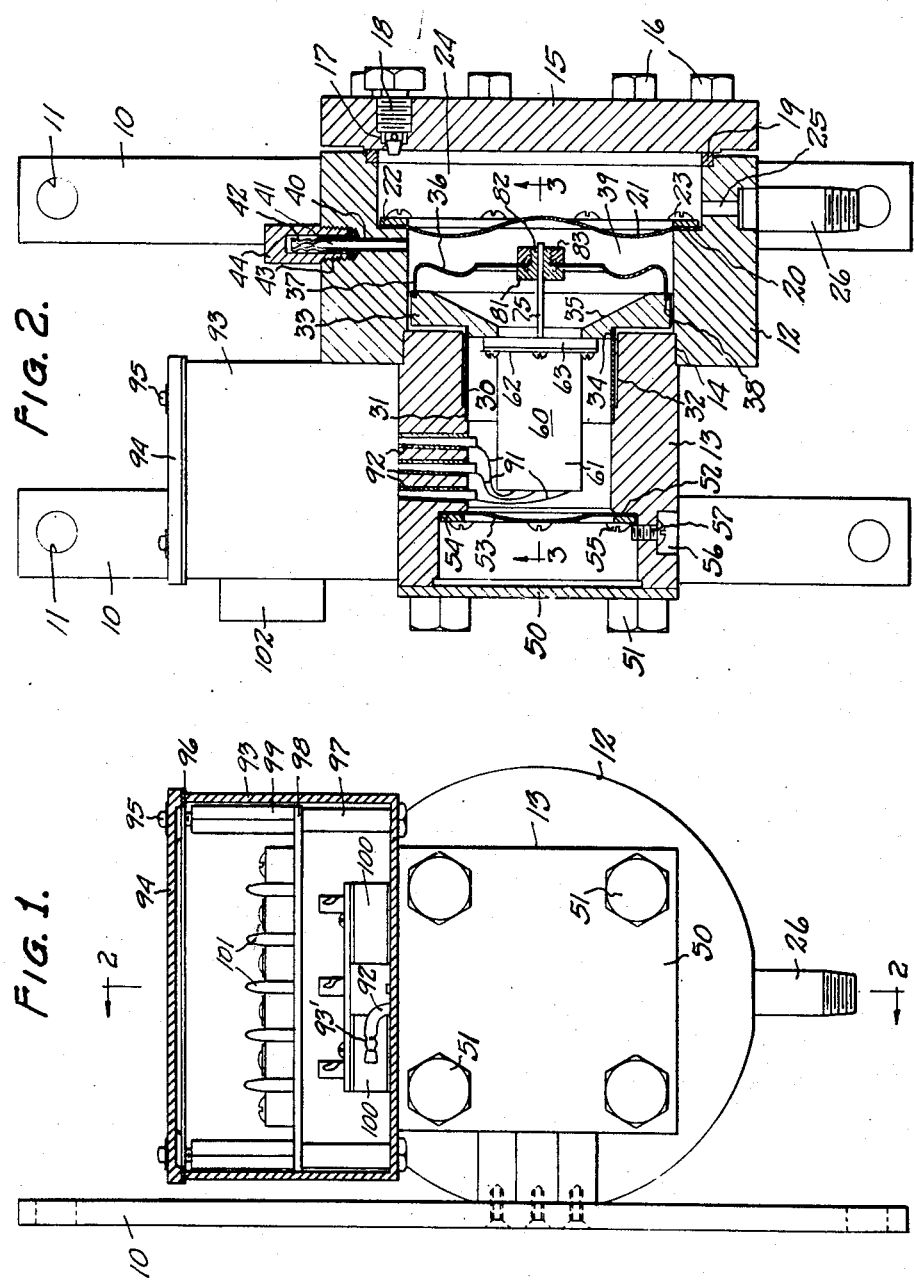

2,693,827

METAL DIAPHRAGM UNIT

George B. Bailey, San Mateo, Calif., assignor to The Hays Corporation, Michigan City, Ind., a corporation of Indiana Original application June 24, 1948, Serial No. 34,960. Divided and this application August 15, 1950, Serial No. 179,566

1 Claim. (Cl. 137—795)

This invention relates to improvements in metal diaphragm units particularly suited for use in fluid pressure gauges.

The primary object of the invention is to provide a novel diaphragm unit for a fluid pressure gauge which employs an unbonded strain gauge as the measuring element thereof.

A further object is to provide a novel diaphragm unit for a device of this character wherein a fluid, preferably a dielectric fluid such as oil, serves as the pressure transmitting means to prevent contact of the measuring element with any conductor and to prevent access of condensate to the measuring element.

A further object is to provide a device of this character which is so constructed as to avoid any error due to extraneous conditions, such as variation in temperature or differences in the rate of effect of changes in temperature in different parts of the unit.

A further object is to provide a device of this character having a measuring diaphragm of novel construction and novel mounting.

A further object is to provide a device of this character which may be utilized either to measure static pressure or to measure the difference of two pressures.

Another object of the invention is to provide a device of this character which is adapted to measure pressures within a wide range, for example, a range of pressures from one inch of water (½₇ pound per square inch) or fractions thereof, to pressures in the neighborhood of 125 pounds per square inch.

Other objects will be apparent from the following specification.

This application is a division of my co-pending application, Ser. No. 34,960, filed June 24, 1948.

In the drawing:

Fig. 1 is an end view of the device with parts broken away.

Fig. 2 is a view of the device with parts shown in section, taken on line 2—2 of Fig. 1.

Referring to the drawings which illustrate the application of the invention to a pressure gauge, the numerals 10 designate mounting or backing members provided with apertures 11 adapted to receive securing means for anchoring the same to a support or a casing. The members 10 support a body or housing having a large diameter cylindrical end portion 12 and a smaller portion 13 having a bore extending from end to end therethrough and preferably being of square or rectangular outer cross-sectional shape, said parts interfitting and being fixedly secured together, as by welding, at 14. The end of the large diameter portion 12 of the housing is spanned by an end plate 15 held in place by securing members or screws 16. The plate 15 preferably has a filling opening or port 17 formed therein normally sealed by a threaded plug or needle valve 18. A gasket ring 19 is seated in a marginal recess at the mouth of the member 12 and is engaged and pressed upon by the plate 15 to form a seal at the joint between the casing parts 12 and 15.

The outer end portion of the cylindrical casing member 12 has an enlarged inner diameter providing an annular shoulder 20. A slack diaphragm 21, which may be formed of rubber or other flexible material, seats at its margin against the shoulder 20, and a ring 22 bears against the outer face of said diaphragm and is secured to the casing member 12 by the securing screws 23. The diaphragm member 20 is spaced inwardly from the end plate 15 and cooperates therewith and with the large diameter bore portion at the outer end of the member 12 to define a chamber 24. The wall of the casing member 12 has a port 25 formed therein with which a fluid pressure conduit 26 is connected, said conduit forming the source of supply of the fluid whose pressure is to be measured.

A thin walled metal tube 30, preferably formed of steel, fits within the bore of the part 13 and has a snug anchorage at 31 at its inner end. The bore of the member 13 is slightly enlarged forwardly of the anchor point 31 to provide a free clearance around the major portion of the tube 30 at 32. The tube 30 projects beyond the inner end of the casing part 13 and mounts an annular member 33 which is preferably formed of beryllium copper or any other alloy selected, for purposes to be mentioned herein. The ring 33 is preferably shouldered at reduced portion 34 for firm anchorage with the outer end of the steel tube and preferably has a frusto-conical surface 35 formed concentrically therein at its outer face. A cup-shaped metal diaphragm 36 having a substantially cylindrical marginal skirt portion 37 is mounted by the annulus or ring 33. In the preferred form of the invention, the ring 33 has an annular or cylindrical groove 38 formed in its outer face concentric therewith to receive and anchor the marginal portion of the diaphragm wall 37 so that the central part 36 of the diaphragm is spaced or offset from the ring 33. The diaphragm 36, 37 is preferably formed from a metal having a low coefficient of expansion. The metal of which this diaphragm is formed and the metal of which the ring 33 is formed preferably have matching coefficients of expansion. A chamber 39 is formed within the casing member 12 between the diaphragms 21 and 36. A bore 40 is formed in the member 12 to communicate with said chamber. Said bore preferably has a tube 41 fitting therein with its outer end projecting outwardly from the casing 12. The fit of the tube 41 within the passage 40 is preferably a shrink fit or any other fit which will insure against the leakage of fluid around the outside of the tube. The chamber 39 is filled with liquid, such as oil, which is introduced therein through the tube 41. After the chamber 39 is completely filled with liquid, the outer projecting end 42 thereof is sealed as by crimping and soldering or by any other suitable means. The outer end portion of the passage 40 is enlarged and screw-threaded at 43, and a protective cap 44 fits around the projecting tube portion 42 and is threaded into the bore portion 43.

The rear or outer end of the small body portion 13 is spanned by a plate 50 secured thereto by securing screws 51. The portion of the member 13 at the rear or outer end thereof has a bore of larger inner diameter than the remainder of the bore of the member 13 to provide a shoulder 52 against which bears the marginal portion of a slack diaphragm 53 which may be formed of rubber or any other material, preferably being the same material of which the diaphragm 21 is formed. The diaphragm 53 is clamped in place by a ring 54 secured to the casing portion 13 by the screws 55. A passage 56 is formed in the member 13 outwardly of the diaphragm 53, said passage constituting an atmospheric opening. The inner end of this passage is preferably reduced and screw-threaded to receive a screw-threaded member or plug 57 adapted to seal the device and to exclude dirt therefrom during shipment. The plug 57 is removed when the device is in use.

A measuring element 60 is mounted in the space between the diaphragms 36 and 53. This measuring element preferably constitutes an unbonded strain gauge. A cup-shaped housing 61 has a marginal outwardly projecting transverse flange 62 at its mouth. A plate 63 spans the mouth of the casing 61 and bears against the flange 62. Screws or other suitable securing members extend through the flange 62, the plate 63 and into the ring 33 to anchor the casing and associated parts to said ring. Any suitable type of strain gauge, preferably of the unbonded type, may be mounted within the casing and has a stem 75 projecting therefrom. The forward end of the stem 75 has fixedly mounted thereon a fitting having an enlarged head 81 bearing flat against the inner face of the diaphragm portion 36 centrally of said diaphragm.

An externally screw-threaded shank 82 projects outwardly through an opening formed within the diaphragm. A nut 83 is threaded on said shank and serves to fixedly clamp the diaphragm to the shank. In other words, the central portion of the diaphragm around the opening through which the shank 82 extends is firmly gripped and clamped between the nut 83 and the fitting head 81. Consequently, any movement of the diaphragm is transmitted to the stem and from the stem to the plate 72 of the strain gauge.

The casing portion 13 is provided with a plurality of passages extending therethrough and communicating with the space between the diaphragms 53 and 36. Electrical leads 91 from the measuring element 60 will extend through suitable sheaths 92 mounted in the passages 90. A cup-shaped casing 93 is fixedly mounted upon the casing part 13 rearwardly of the casing part 12. This casing is preferably closed by a cover 94 anchored in place by the securing members 95 and pressing against a sealing gasket ring 96 which bears against the upper open cup-shaped housing 93. Within the cup-shaped housing 93 are mounted posts 97 which preferably support a partition 98. Posts 99 serve to space the partition 98 from the cover 94. Suitable terminals 100 mounted within the casing 93 and fixed resistors 101 are mounted upon the platform 98. Electrical leads to the various components of the device may extend through a tubular neck 102.

In the operation of the device, fluid, such as a liquid or gas under pressure, which is subject to measurement, is transmitted from the conduit 26 through the passage 25 into the chamber 24 where it acts against the flexible diaphragm 21. The chamber 39 which is filled with liquid is subjected to the pressure in the chamber 24, and the oil or other liquid in the chamber 39 forms means for transmitting the pressure in the chamber 24 to the measuring diaphragm 36. The diaphragm 36, being formed from metal and preferably configured substantially as shown so that it does not constitute a flat member, but instead has an offset end wall which is provided with circular concentric bends, is sufficiently flexible to transmit the pressure to and through the stem 75 to actuate the strain gauge 60. Observe that the chamber in which the strain gauge element is located is filled with a non-conductive liquid, such as oil, and that this oil is free to enter the space behind or within the diaphragm 36. Inasmuch as the range of movement of the diaphragm is limited, no problem of oil displacement is encountered. In actual practice the full range of movement of the diaphragm is in the order of .001 inch. This movement is obviously so small as not to produce any substantial liquid displacement effect or problem, and any displacement which occurs is accommodated by the flexible diaphragm 53. In the preferred form of the device, the oil is retained within the rear or inner portion of the part 13 to immerse the strain gauge 60 and is prevented from entering the chamber 93. In this connection the tubes 92, which pass through the openings 90 and lead the terminals or leads 91 into the chamber 93, are preferably projected into the housing 93 and crimped or otherwise sealed at 93′, as best illustrated in Fig. 1. The immersion of the strain gauge in the oil insulates said gauge from condensate or other conductive moisture.

The shape of the diaphragm forms one of the important features of this invention. Observe that the cup-shaped form provides the cylindrical wall portion 37 to offset the transverse pressure measuring surface of the diaphragm from its mounting ring 33. The importance of this construction is that it provides means for avoiding any error in measurement due to temperature effects, that is, from effects due to any difference in the rate of response to changes of temperature upon the diaphragm 36, 37 and upon the ring 33. The mass of the ring 33 is much greater than the mass of the diaphragm, and this difference in mass, even in cases where the coefficient of expansion of the materials of which the diaphragm and its mounting are formed are substantially equal, will tend to produce a difference in the rate of response of these parts to changes of temperature. Any difference occurring in this respect, due to temperature effects, can be absorbed by the cylindrical marginal portion 37 of the diaphragm. Thus a tendency of the ring 33 to expand radially or circumferentially compared to the diaphragm is absorbed and taken up by the cylindrical diaphragm portion 37 which is free to flex radially without flexing the transverse end or working portion 36 of the diaphragm.

It will be obvious that the construction herein illustrated, wherein the sleeve 30 has clearance within its socket 32 and the ring itself has clearance from both the end and the circumferential walls of the chamber of the housing 12 in which it is received, permit the free response of the ring 33 to temperature effects without injury thereof or interference with the other working parts of the device. It may be mentioned that the effect of the difference of the rate of temperature response is minute and under ordinary conditions in measuring devices would not be critical. However, where, as mentioned before, a strain gauge is used as the measuring element and its full range of movement is in the neighborhood of only .001 inch, the small or minute temperature effect becomes critical. Thus where the difference in temperature effects between the ring and its mounting would be as low as .000001 inch, the same would be measurable by the instrument and would detract from its accuracy if the diaphragm unit were not constructed in a manner to compensate for the effect. It might be mentioned in this connection that the mounting of a flat or substantially unskirted diaphragm within a mounting ring of greater mass would cause, when subjected to the same temperature effects mentioned, a distortion or buckling of the diaphragm which would introduce an appreciable error in the readings obtained, due to the actuation of the strain gauge by this distorting or buckling action.

The problem of compensation for errors arising as the result of changes in temperature is common. The arrangement of the parts, and particularly the skirted character of the diaphragm 36, the liquid immersion of the strain gauge 60, and the location of the resistors 101 externally of the liquid chamber, serves to hold temperature errors to a minimum. Further compensation for any temperature errors which may occur can be provided by including, as a part of each of the fixed resistors 101, a temperature sensitive compensating resistor element. In this way an electrical temperature compensation, in addition and adjustment of such temperature sensitive mentioned above, is provided in the device. It might be mentioned in this connection that the use of such temperature sensitive compensating resistor elements is made possible by the location of those elements externally of the oil-filled chamber within which the strain gauge or other transmitter 60 is located. If the entire Wheatstone bridge circuit were encased in the oil-filled chamber, the addition and adjustment of such temperature sensitive resistors to the circuit would present serious problems and would be impractical. The use of such temperature sensitive resistor elements outside of the oil-filled chamber is practical and feasible, however, and produces an increased accuracy of response of the gauge to the fluid condition being measured.

While the preferred embodiments of the invention have been illustrated and described herein, it will be understood that changes in the construction may be made within the scope of the appended claims without departing from the spirit of the invention.

I claim:

A diaphragm unit for use in a fluid pressure gauge comprising a rigid annulus, means mounting said annulus, and a cup-shaped metal diaphragm having an end portion and a skirt portion, said annulus fixedly mounting said diaphragm at the margin of said skirt portion and spaced inwardly from the periphery of said annulus with said diaphragm end portion spaced from the adjacent surface of said annulus, said annulus including a central reduced portion projecting from the face thereof opposite the face confronting said diaphragm, and said mounting means constituting a metal tube encircling said reduced portion and projecting beyond the outer end thereof.

References Cited in the file of this patent

UNITED STATES PATENTS

| Number | Name | Date |
|---|---|---|
| 1,630,292 | Ely | May 31, 1927 |
| 1,781,287 | Mayo | Nov. 11, 1930 |
| 1,870,904 | Giesler | Aug. 9, 1932 |
| 1,938,167 | Baker | Dec. 5, 1933 |
| 1,978,397 | Becker | Oct. 30, 1934 |
| 2,036,582 | Kollsman | Apr. 7, 1936 |
| 2,447,261 | Mock | Aug. 17, 1948 |
| 2,551,489 | Eichmann | May 1, 1951 |